United States Patent
Maldoner et al.

(10) Patent No.: US 12,348,147 B2
(45) Date of Patent: Jul. 1, 2025

(54) FREQUENCY MODULATION FOR CONTROLLING SWITCHED RESONANT CONVERTER

(71) Applicant: Tridonic GmbH & Co KG, Dornbirn (AT)

(72) Inventors: Jakob Maldoner, Dornbirn (AT); Patrick Marte, Dornbirn (AT); Patrick Walch, Dornbirn (AT)

(73) Assignee: Tridonic GmbH & Co KG, Dornbirn (AT)

( * ) Notice: Subject to any disclaimer, the term of this patent is extended or adjusted under 35 U.S.C. 154(b) by 223 days.

(21) Appl. No.: 18/040,123

(22) PCT Filed: Sep. 10, 2021

(86) PCT No.: PCT/EP2021/074895
§ 371 (c)(1),
(2) Date: Jan. 31, 2023

(87) PCT Pub. No.: WO2022/053596
PCT Pub. Date: Mar. 17, 2022

(65) Prior Publication Data
US 2023/0275517 A1    Aug. 31, 2023

(30) Foreign Application Priority Data

Sep. 10, 2020  (EP) .................................. 20195444

(51) Int. Cl.
*H02M 3/335*   (2006.01)
*H02M 3/00*    (2006.01)

(52) U.S. Cl.
CPC ......... *H02M 3/33571* (2021.05); *H02M 3/01* (2021.05)

(58) Field of Classification Search
CPC ............................ H02M 3/33571; H02M 3/01
See application file for complete search history.

(56) References Cited

U.S. PATENT DOCUMENTS

| 9,491,815 | B2* | 11/2016 | Jin | H05B 45/46 |
| 2004/0066154 | A1* | 4/2004 | Ito | H05B 45/3725 |
| | | | | 315/291 |

(Continued)

FOREIGN PATENT DOCUMENTS

EP    2484180 B1    8/2012

OTHER PUBLICATIONS

PCT/EP2021/074895 International Search Report and Written Opinion dated Nov. 23, 2021, 13 pages.

*Primary Examiner* — Kyle J Moody
(74) *Attorney, Agent, or Firm* — Andrus Intellectual Property Law, LLP

(57) ABSTRACT

An LED converter for supply of an LED load (18) is provided. The LED converter comprises a switched resonant converter (1) having at least one switch (11, 12) controlled by a control unit of the switched resonant converter (1). The control unit is configured to control a switching operation of the at least one switch (11, 12) such that the switched resonant converter (1) supplies an adjustable constant current (17) to output terminals for the LED load (18). The control unit is further configured to generate the adjustable constant current (17) by alternatingly controlling the at least one switch (11, 12) with one of at least two different, and adaptable, switching frequencies (44, 45) at a time for a respective time period (54, 55), and by adjusting a relative duration of the time periods (54, 55). Thereby, a resolution of an output current of the LED converter for supply of the LED load (18) is improved, which is of particular relevance for dimming applications.

14 Claims, 5 Drawing Sheets

(56) References Cited

U.S. PATENT DOCUMENTS

2005/0179393 A1\* 8/2005 Murakami ............. H05B 45/46
  315/80
2015/0334797 A1 11/2015 Vonach \* cited by examiner

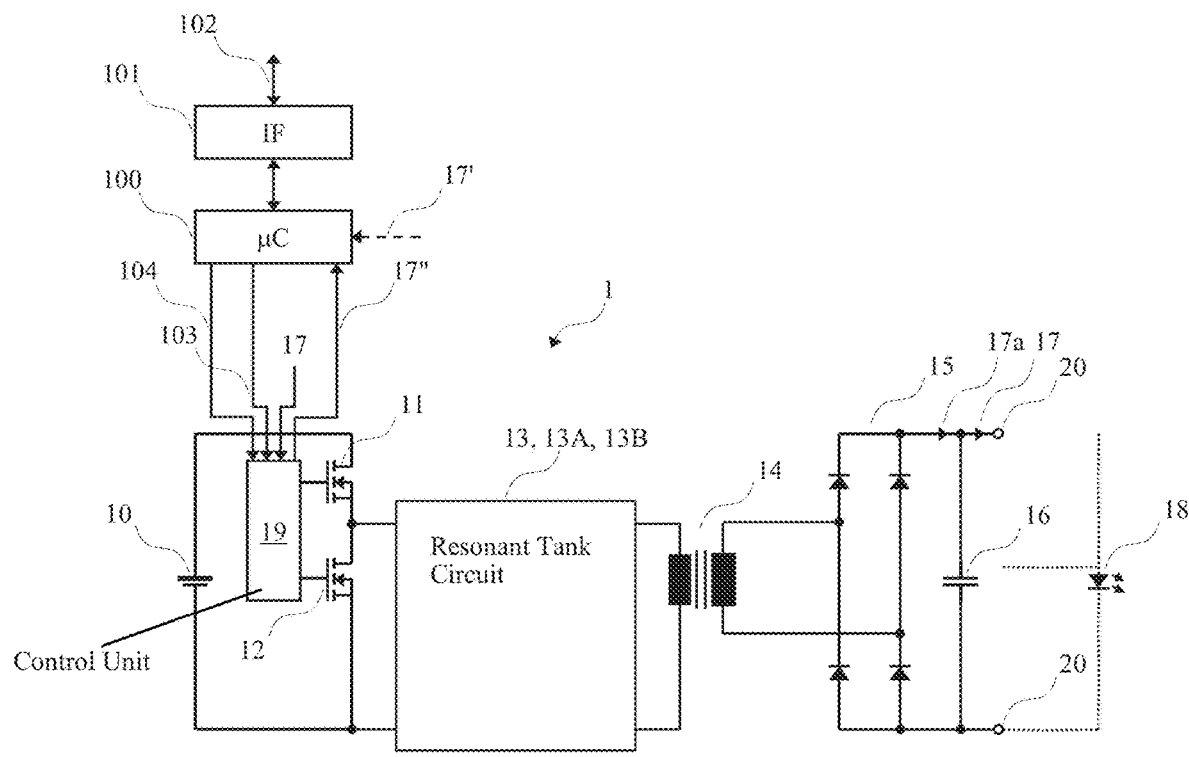
Fig. 1
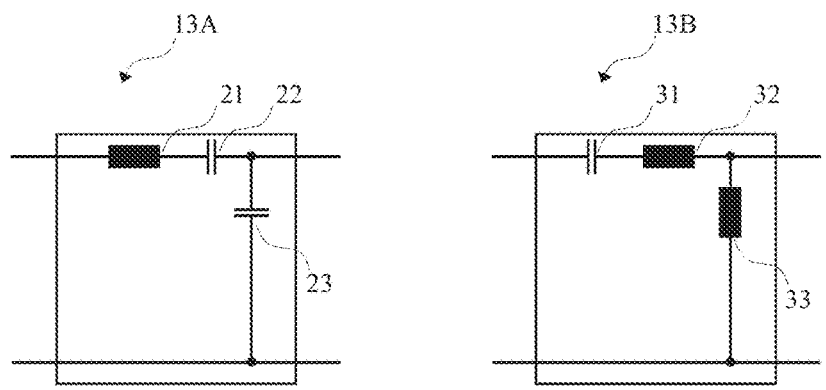
Fig. 2
Fig. 3

FREQUENCY MODULATION FOR CONTROLLING SWITCHED RESONANT CONVERTER

CROSS REFERENCE TO RELATED APPLICATIONS

The present application is the U.S. national stage application of international application PCT/EP2021/074895 filed Sep. 10, 2021, which international application was published on Mar. 17, 2022 as International Publication WO 2022/053596A1. The international application claims priority to European Patent Application No. 20195444.3 filed Sep. 10, 2020.

TECHNICAL FIELD OF THE INVENTION

The present invention relates to an LED converter for supply of an LED load, and in particular to an LED converter comprising a switched resonant converter, such as e.g. a LLC or LCC converter.

BACKGROUND OF THE INVENTION

Switched resonant converters, such as e.g. LLC or LCC converter, are generally known in the art. In such LED converters having a resonant topology, an output current may be adjusted by changing a switching frequency. Especially high switching frequencies above a peak resonance frequency of the LED converter occur when low output currents are to be feedback controlled. As such, dimming an LED load of such LED converters may suffer from a poor resolution of the output current when using a digital control. For example, even when given a switching frequency of up to f=2 MHz (1/f=500 ns), a controller clock frequency of f=40 MHz (1/f=25 ns) may require changing the switching frequency by $\Delta f=1/(500\ ns)-1/(500\ ns+25\ ns) \approx 100$ kHz for a single dimming step. In other words, the output current may only be changed in accordance with a low and finite number of steps.

EP 2484180B1 teaches a dimmable LED driver having a resonant DC/DC converter which can be PWM operated with two different and fixed frequencies.

SUMMARY OF THE INVENTION

Therefore, the object of the present invention is to improve a resolution of an output current of a switched resonant converter for supply of an LED load.

The invention is defined by the appended independent claims. Preferred embodiments are set forth in the dependent claims and in the following description and drawings.

According to a first aspect, an LED converter for supply of an LED load is provided. The LED converter comprises a switched resonant converter having at least one switch controlled by a control unit of the switched resonant converter. The control unit is configured to control a switching operation of the at least one switch such that the switched resonant converter supplies an adjustable constant current to output terminals for the LED load. The control unit is further configured to generate the adjustable constant current by alternatingly controlling the at least one switch with one of at least two different switching frequencies at a time for a respective time period, and by adjusting a relative duration of the time periods. The at least two different switching frequencies are adaptable.

The LED converter may comprise a further control unit, such as e.g. a microcontroller, the further control unit communicating with the control unit preferably over a bidirectional channel.

The further control unit may be is connected to a communication interface 101 of the LED converter, such as e.g. a DALI interface, communicating externally over a wireless or wireline channel such as e.g. a DALI bus.

The further control unit may be supplied with a signal representing the output current or LED current.

The further control unit may send a signal to the control unit instructing the duty cycles(s) of the discrete frequencies used by the control unit for operating the one or more switches.

The frequencies to be used by the control unit may be instructed/modified by the further control unit. Alternatively, the frequencies to be used and/or the modification thereof may be determined by the control unit without instructions from the further control unit.

The at least two different switching frequencies may be constant.

The at least two different switching frequencies may respectively exceed a peak resonance frequency of the converter.

The at least two different switching frequencies may comprise two different switching frequencies.

A lower one of the two different switching frequencies may be associated with a first load current.

A higher one of the two different switching frequencies may be associated with a second load current lower than the first load current.

The switching operation of the at least one switch may be continuous.

According to a second aspect, a lighting system is provided. The lighting system comprises an LED converter according to an embodiment the first aspect, and an LED load configured to be supplied by an output current of said LED converter.

According to a third aspect, a method of operating an LED converter for supply of an LED load is provided. The LED converter comprises a switched resonant converter having at least one switch controlled by a control unit of the switched resonant converter. The method comprises: controlling a switching operation of the at least one switch such that the switched resonant converter supplies an adjustable constant current to output terminals for the LED load, and generating the adjustable constant current by alternatingly controlling the at least one switch with one of at least two different switching frequencies at a time for a respective time period, and by adjusting a relative duration of the time periods. The at least two different switching frequencies are adapted when operating the LED converter.

The method may be performed by an LED converter according to an embodiment of the first aspect.

According to a fourth aspect, a control unit for an LED converter is provided. The control unit is designed for implementing the method according to an embodiment of the third aspect.

BRIEF DESCRIPTION OF THE DRAWINGS

Further aspects, advantages and objects of the invention will become evident for the skilled reader by means of the following detailed description of the embodiments of the invention, when taking into conjunction with the figures of the enclosed drawings.

FIG. 1 illustrates an LED converter for supply of an LED load according to an embodiment of the first aspect, and a lighting system according to an embodiment of the second aspect;

FIGS. 2 and 3 respectively illustrate exemplary resonant tank circuits for the LED converter according to FIG. 1;

DETAILED DESCRIPTION OF THE PREFERRED EMBODIMENTS

Figure 4:
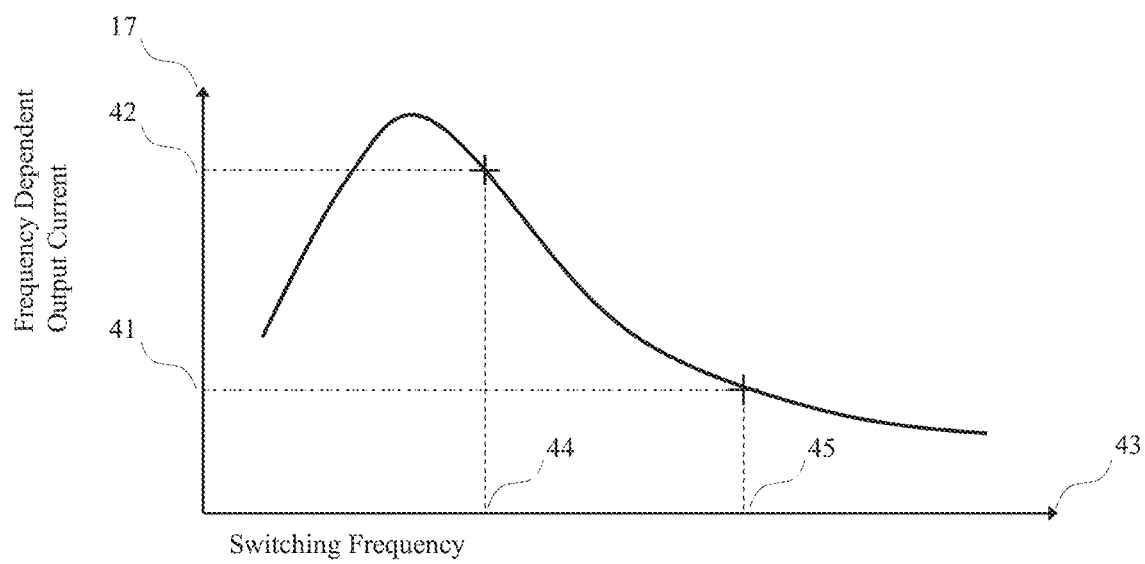
FIG. 4 illustrates a frequency-dependency of the current supplied to the output terminals of the LED converter according to FIG. 1 comprising the LLC resonant tank circuit according to FIG. 3.

The invention will now be described with respect to various embodiments. The features of these embodiments may be combined with each other unless specified otherwise.

FIG. 1 illustrates an LED converter 1 according to an embodiment of the first aspect for supply of an LED load 18, and a lighting system according to an embodiment of the second aspect.

As used herein, the term "LED converter" refers to a converter for supplying an LED load 18 as a power sink.

As used herein, the term "switched converter" refers to an electronic power supply that efficiently converts electrical power, and in particular voltage and/or current characteristics, by periodically alternating between low-dissipation, full-on and full-off states of electronic switching elements of the switched converter to control a transfer of electric power from a power source to a power sink via a reactive power storage circuit of the switched converter comprising inductive and/or capacitive elements.

The LED converter comprises a switched resonant converter 1 having at least one switch 11, 12, preferably two switches 11, 12, arranged in series as a half-bridge on the primary side of the (preferably isolated by means of a galvanic isolation barrier) switched resonant converter 1, and supplied by a DC voltage 10.

As used herein, the term "switched resonant converter" refers to a switched converter comprising a reactive power storage circuit comprising inductive as well as capacitive elements, known as "resonant tank" circuit. The resonant tank circuit may be designed to resonate, i.e. to yield a peak response, at a given peak resonance frequency. Exemplary resonant tank circuits 13A, 13B are presented in connection with FIGS. 2 and 3 below.

The switched resonant converter 1 comprises a control unit 19, such as e.g. an ASIC being provided with a feedback signal and issuing a control signal for the primary side switches 11, 12. In the example of FIG. 1, an indication of a current 17 provided to output terminals 20 for the LED load 18 is indicated as the feedback signal. Note that the feedback signal 17 representing the current supplied to the LED(s) may be derived from the primary side or the secondary side of the isolation stage of the resonant converter.

The control unit 19 is configured to control a switching operation of the at least one switch 11, 12 such that the switched resonant converter 1 supplies the adjustable and feedback-controlled constant current 17 to the output terminals 20 for the LED load 18.

The switched resonant converter 1 of FIG. 1 has primary (source) and secondary (sink) sides connected via inductive/magnetic coupling by means of a transformer 14 as galvanic isolation stage. On the primary side, the switched resonant converter 1 comprises a DC voltage source 10 as a power source. For example, the DC voltage may be 400 V. The DC voltage may be generated by e.g. by a PFC stage supplied with a rectified AC mains voltage.

On the secondary side, the switched resonant converter 1 is configured to supply an adjustable (feedback-controlled) constant current 17 to the output terminals 20 to which an LED load 18 may be connected as a power sink.

The switches 11, 12 of the switched resonant converter 1 of FIG. 1 may be Gallium nitride, GaN, field-effect transistors, for example.

The switches 11, 12 control and adjust an electric power transfer from the primary side via the resonant tank circuit 13, 13A, 13B and the transformer 14 to the secondary side.

The switched resonant converter 1 of FIG. 1 further comprises four diodes implementing a full-bridge rectifier circuit 15 on the secondary side for rectification of the electric power transferred from the primary side to the secondary side, as well as a capacitor 16 for levelling out the output of the rectifier circuit 15 to supply an average current 17 at the output terminals of the switched resonant converter 1. Alternatively, the switched resonant converter 1 may implement a full-wave rectifier circuit 15 comprising only two diodes and a transformer 14 having a center-tapped secondary side.

The control unit 19 is configured to generate an adjustable constant current 17 by alternatingly controlling the at least one switch 11, 12 with one of at least two different (spaced) switching frequencies 44, 45 at a time for a respective time period 54, 55, and by adjusting a relative duration of the time periods 54, 55. Thus the duty cycle of the usage of the different switching frequencies is adapted in order to adjust the average frequency and thus the time average of the resulting secondary side current.

Preferably, thus not necessarily, the frequency of usage of the at least two frequencies is constant and only their duty cycle is adapted from 0 to 100% for the first frequency and correspondingly 100% to 0% for the second frequency.

However, one or more, even all of the discrete frequencies may be adapted, e.g. depending on a dimming level.

As used herein, the term "adjustable constant current" refers to an electric current having an average value that may be adjusted.

As can be seen on FIG. 1, a further control unit 100, such as e.g. a microcontroller 100 may be provided, communicating with the control unit 19 preferably in a bidirectional channel 103, 104, 17'.

The further control unit 100 may be connected to a communication interface 101, such as e.g. a DALI interface, communicating externally over a wireless or wireline channel such as e.g. a DALI bus 102. The further control unit 100 may thus ne supplied with an external dimming control value.

The further control unit 100 is supplied with a signal representing the output current or LED current. The control unit 19 may send a signal 17" to the further control unit 100 representing the output current or the LED current. Alternatively, such signal 17' may also be directly be supplied to the further control unit 100.

The further control unit may send a signal 103 to the control unit instructing the duty cycles(s) of the discrete frequencies used by the control unit 19 for operating the one or more switches 11.

According to the invention, the value of one or more of the discrete frequencies may be adaptive. E.g., one or more of these values may depend on the current diming level. Further, whenever the duty cycle of usage of one of the frequencies reaches a preset minimum value, at least one of the frequencies may be shifted (in a frequency range preferably higher than the resonance frequency) in a manner that the resulting LED current will change. In turn the PWM modulation of the usage of the discrete frequencies will be modified such that none of the discrete frequencies is used with duty cycle lower than the preset minimum value.

The frequencies to be used by the control unit 19 can be instructed/modified by the further control unit by a signal 104. Alternatively, the frequencies to be used and/or the modification thereof may be determined by the control unit 19 without instructions from the further control unit 100.

Thus, the value of the at least one of the plurality of discrete frequencies used can be modified during ongoing operation of the converter, optionally together with an adjustment of the duty cycles. These two parameters are thus the control values for the feedback control of the LED current or output current of the converter.

Further details of the operation of the switched resonant converter 1 are presented in connection with FIGS. 4-6 below.

FIGS. 2 and 3 respectively illustrate exemplary resonant tank circuits 13A, 13B for the LED converter 1 according to FIG. 1.

Serial inductivity 21 ($L_{RES}$), serial capacity 22 ($C_{RES,S}$) and parallel capacity 23 ($C_{RES,P}$) shown in FIG. 2 implement an example of a resonant tank circuit 13A for a known LCC resonant topology.

Serial capacity 31 ($C_{RES}$), serial inductivity 32 ($L_{RES,S}$) and parallel inductivity 33 ($L_{RES,P}$) shown in FIG. 3 implement an example of a resonant tank circuit 13B for a known LLC resonant topology.

Those skilled in the art will appreciate that similar converter structures may be formed as well. For example, the parallel capacity 23 of the LCC resonant tank circuit of FIG. 2 may alternatively be arranged on the secondary side between the transformer 14 and the rectifier circuit 15. As a further example, serial arrangements of capacities and inductivities in resonant tank circuits may be reversed, too.

FIG. 4 illustrates a frequency-dependency of the (output) current 17 supplied to the output terminals of the LED converter according to FIG. 1 comprising the LLC resonant tank circuit according to FIG. 3.

The curve of FIG. 4 shows the output/load current 17 as a function of a switching frequency 43 of the at least one switch 11, 12.

The output/load current 17 peaks at a peak resonance frequency given by the design of the resonant tank circuit 13B according to FIG. 3 and decreases with frequency deviation from the peak resonance frequency.

As already mentioned in connection with FIG. 1, the at least one switch 11, 12 of the switched resonant converter 1 is alternatingly controlled with one of at least two different switching frequencies 44, 45 at a time. The at least two different switching frequencies 44, 45 may respectively exceed the peak resonance frequency of the converter 1.

As an example, FIG. 4 illustrates two different switching frequencies 44, 45 higher than the peak resonance frequency. In other words, FIG. 4 shows that the at least two different switching frequencies 44, 45 may comprise two different switching frequencies 44, 45.

The two different switching frequencies 44, 45 are associated with corresponding output/load currents 17. More specifically, a lower one 44 of the two different switching frequencies 44, 45 may be associated with a first load current 42. Likewise, a higher one 45 of the two different switching frequencies 44, 45 may be associated with a second load current 41 lower than the first load current 42.

As an example, the lower one 44 of the two different switching frequencies 44, 45 may be 0.5 MHz and be associated with a first output/load current of 1 A, and the higher one 45 of the two different switching frequencies 44, 45 may be 2 MHz and be associated with a second output/load current of 0.1 A. Alternating between the two different switching frequencies 44, 45 yields an average output/load current between 0.1 A and 1 A.

The at least two different switching frequencies 44, 45 may be constant or adaptable. Alternatively, the at least two different switching frequencies 44, 45 may be constant.

Figure 5:
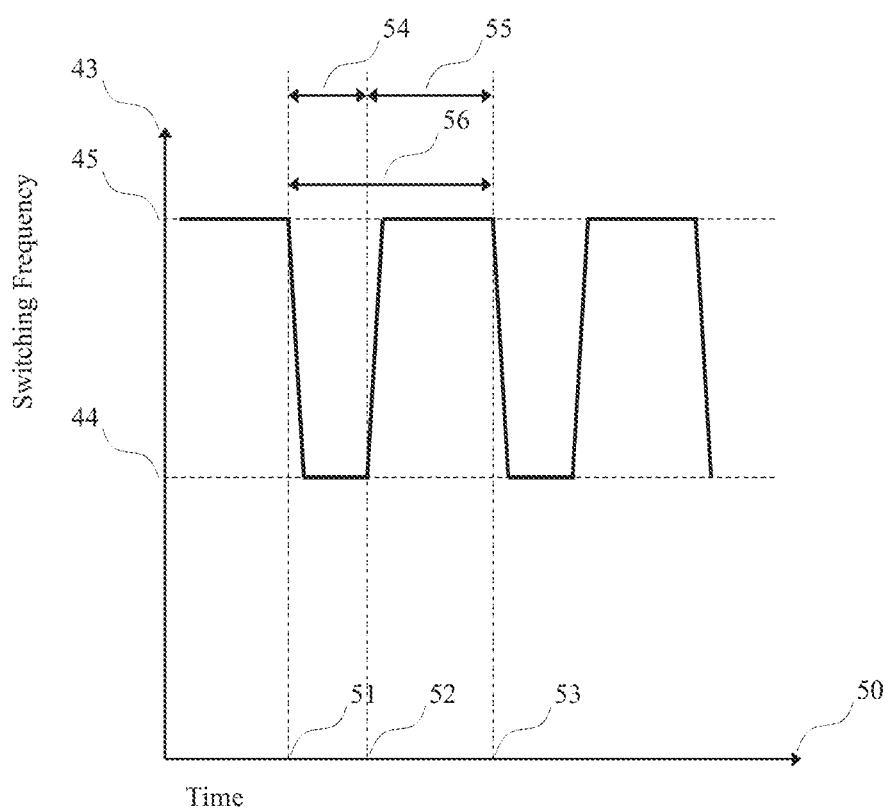
FIG. 5 illustrates alternatingly controlling the switching operation of the at least one switch with one of at least two different switching frequencies at a time for a respective time period.

FIG. 5 illustrates alternatingly controlling the switching operation of at least one switch 11, 12 with one of at least two different switching frequencies 44, 45 at a time for a respective time period 54, 55.

The curve of FIG. 5 shows the switching frequency 43 of the at least one switch 11, 12 of the at least one switch 11, 12 versus time 50.

As already mentioned in connection with FIG. 1, the switching frequency 43 is alternatingly controlled with one of the two different switching frequencies 44, 45 at a time for a respective time period 54, 55.

In the example of FIG. 5, the lower one 44 of the two different switching frequencies 44, 45 applies in the time period 54 extending between time instants 51, 52, and the higher one 45 of the two different switching frequencies 44, 45 applies in the time period 55 extending between time instants 52, 53. Then, the sequence of time periods 54, 55 starts over according to a time period 56 comprising the time periods 54, 55.

In case of very short time periods 54 or 55, the duration of the time period 56 or its reciprocal value known as modulation frequency $f_{mod}$, may be fixed to values in the order of 500 Hz to 100 kHz.

As an example, $f_{mod}$ may be fixed to 20 kHz, corresponding to a duration of the modulation time period 56 of 50 μs. Given the different switching frequencies 44, 45 of f=0.5 and 2 MHz mentioned earlier, the modulation time period 56 equals N=25 and 100 switching periods, respectively. In other words, fixing the modulation frequency $f_{mod}$ may ensure that a resolution of the switching frequency is much finer than a resolution of the modulation frequency $f_{mod}$. Furthermore, a maximum slope Δf/Δt between the subsequent time periods 54, 55 may be defined.

This avoids flickering issues in case of very short time periods 54, 55.

According to FIG. 5, the switching operation of the at least one switch 11, 12 may be continuous. This means that the switching frequency 43 controlling the switching operation of at least one switch 11, 12 consistently exceeds zero.

Figure 6:
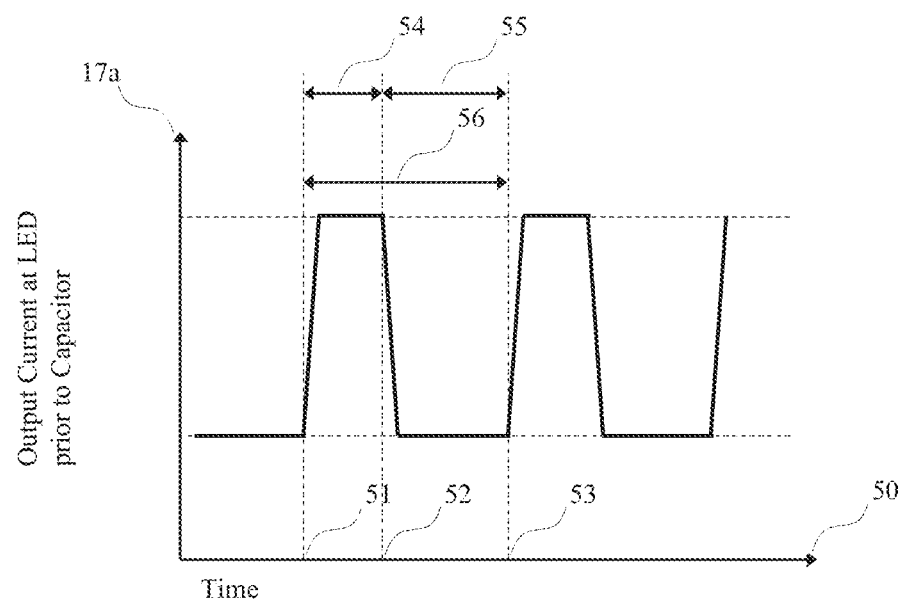
FIG. 6 illustrates generating the current supplied to the output terminals for the LED load as a result of the alternating control of the switching frequency shown in FIG. 5.

FIG. 6 illustrates generating the current 17 supplied to the output terminals for the LED load 18 as a result of the alternating control of the switching frequency 43 shown in FIG. 5;

The curve of FIG. 6 shows the current 17a of the LED converter before being leveled out by the capacitor 16 versus time 50.

According to FIG. 4, each switching frequency 43 is associated with a corresponding output/load current 17. Accordingly, the time instants 51, 52, 53 of FIG. 6 correspond to those shown in FIG. 5, and applying the two different switching frequencies 44, 45 in the time periods 54, 55 of FIG. 5 results in corresponding currents 17a in the same time periods 54, 55 of FIG. 6.

As already mentioned in connection with FIG. 1, an average value of the output/load current 17 may be adjusted by adjusting a relative duration of the time periods 54, 55.

Thus, extending a duration of the time period 54 of a higher first current 17a to the detriment of a duration of the time period 55 of a second current 17a lower than the first current 17a increases a contribution of the higher first current 17a and decreases a contribution of the lower second current 17a to the average output/load current 17.

Vice versa, extending the duration of the time period 55 of the second current 17a lower than the first current 17a to the detriment of the duration of the time period 54 of the first current 17a increases a contribution of the lower second current 17a and decreases a contribution of the higher first current 17a to the average output/load current 17.

In contrast to a burst operation, the switched resonant converter 1 is continuously operated with different frequencies. A low current is achieved by controlling the converter with a very high switching frequency, rather than stopping the operation of the converter.

The different frequencies may be set in a feed-forward manner, rather than resulting from a feedback control algorithm.

Figure 7:
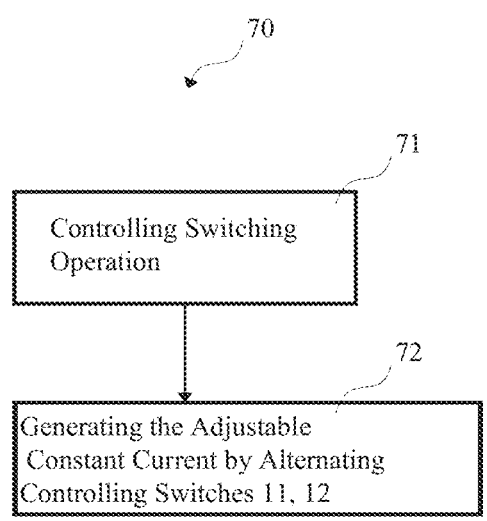
FIG. 7 illustrates a method according to an embodiment of the third aspect. The method is for operating an LED converter for supply of an LED load.

FIG. 7 illustrates a method 70 according to an embodiment of the third aspect. The method 70 is for operating an LED converter 1 for supply of an LED load 18.

The LED converter comprises a switched resonant converter 1 having at least one switch 11, 12 controlled by a control unit of the switched resonant converter 1.

The method 70 comprises controlling 71 a switching operation of the at least one switch 11, 12 such that the switched resonant converter 1 supplies an adjustable constant current 17 to output terminals for the LED load 18.

The method 70 further comprises generating 72 the adjustable constant current 17 by alternatingly controlling the at least one switch 11, 12 with one of at least two different switching frequencies 44, 45 at a time for a respective time period 54, 55, and by adjusting a relative duration of the time periods 54, 55.

The control unit is designed for implementing the method 70 according to an embodiment of the third aspect. Accordingly, the method 70 may be performed by an LED converter according to an embodiment of the first aspect.

The invention claimed is:

1. An LED converter for supply of an LED load (18), comprising
a switched resonant converter (1) having
at least one switch (11, 12) controlled by
a control unit of the switched resonant converter (1),
the control unit being configured to control a switching operation of the at least one switch (11, 12) such that the switched resonant converter (1) supplies an adjustable constant current (17) to output terminals for the LED load (18),
the control unit further being configured to generate the adjustable constant current (17) by alternatingly controlling the at least one switch (11, 12) with one of at least two different switching frequencies (44, 45) at a time for a respective time period (54, 55), and by adjusting a relative duration of the respective time periods (54, 55),
wherein the at least two different switching frequencies (44, 45) respectively exceed a peak resonance frequency of the converter (1) and the at least two different switching frequencies (44, 45) are adaptable; and
a further control unit (100) communicating with the control unit (19) over a bidirectional channel (103, 104, 17').

2. The LED converter of claim 1, wherein the further control unit (100) is connected to a communication interface (101) of the LED converter that communicates externally over a wireless or wireline channel.

3. The LED converter of claim 1, wherein the further control unit (100) is supplied with a signal representing the output current or an LED current.

4. The LED converter of claim 1, wherein the further control unit (100) sends a signal (103) to the control unit (1) instructing duty cycles of the different switching frequencies used by the control unit (19) for operating the one or more switches (11).

5. The LED converter of claim 1, wherein the different switching frequencies to be used by the control unit (19) are provided by the further control unit (100), or wherein the different switching frequencies to be used by the control unit (19) are determined by the control unit (19) without instructions from the further control unit (100).

6. The LED converter of claim 1, wherein the at least two different switching frequencies (44, 45) consists of only two different switching frequencies (44, 45).

7. A lighting system, comprising:
an LED converter of claim 1, and
an LED load (18) configured to be supplied by an output current of said LED converter.

8. A method (70) of operating an LED converter for supply of an LED load (18), the LED converter comprising a switched resonant converter (1) having
at least one switch (11, 12) controlled by
a control unit of the switched resonant converter (1),
the method (70) comprising:
controlling (71) a switching operation of the at least one switch (11, 12) according to a duty cycle such that the switched resonant converter (1) supplies an adjustable constant current (17) to output terminals for the LED load (18);
generating (72) the adjustable constant current (17) by alternatingly controlling the at least one switch (11, 12) with one of at least two different switching frequencies (44, 45) at a time for a respective time period (54, 55) of the duty cycle, and by adjusting a relative duration of the respective time periods (54, 55), of the duty cycle;
adapting the at least two different switching frequencies (44, 45) during the operation of the LED converter, wherein the at least two different switching frequencies (44, 45) respectively exceed a peak resonance frequency of the switched resonant converter (1);
measuring the adjustable constant current and generating a feedback signal representing the measured adjustable constant current;
using the feedback signal to adjust the duty cycle when controlling the switched resonant converter to supply the adjustable constant current to the output terminals for the LED load.

9. The method (70) of claim 8, wherein the method (70) is performed by an LED converter of claim 1.

10. A control unit for an LED converter, wherein the control unit is designed for implementing the method (70) of claim 8.

11. The method of claim 8 wherein the feedback signal is provided to a further control unit that is not part of the switched resonant converter, and said further control unit communicates with the control unit of the switched resonant converter over a bidirectional channel, and further wherein the further control unit sends a signal to the control unit of the switched resonant converter instructing duty cycles of the different switching frequencies used by the control unit of the switched resonant converter to operate the one or more switches of the switched resonant converter.

12. The method of claim 11 wherein the different switching frequencies to be used by the control unit of the switched resonant converter are provided by the further control unit not part of the switched resonant converter.

13. The method of claim 11 wherein the different switching frequencies to be used by the control unit of the switched resonant converter are determined by the control unit of the switched resonant converter without instructions from the further control unit not part of the switched resonant converter.

14. The method of claim 11 wherein the further control unit not part of the switched resonant converter is connected to a communications interface for a lighting system and receives instructions regarding dimming levels from said communications interface, and the signal sent to the control unit of the switched resonant converter instructing duty cycles is based in part on the instructions regarding dimming levels.

* * * * *